United States Patent
Ezrielev et al.

(10) Patent No.: US 12,461,898 B2
(45) Date of Patent: Nov. 4, 2025

(54) REMEDIATING A CHANGE IN A SYSTEM OF REPRESENTATION OF INFORMATION IN DATA USED BY A DATA PIPELINE

(71) Applicant: Dell Products L.P., Round Rock, TX (US)

(72) Inventors: Ofir Ezrielev, Beer Sheva (IL); Hanna Yehuda, Acton, MA (US); Inga Sogaard, Wichita, KS (US)

(73) Assignee: Dell Products L.P., Round Rock, TX (US)

( * ) Notice: Subject to any disclaimer, the term of this patent is extended or adjusted under 35 U.S.C. 154(b) by 273 days.

(21) Appl. No.: 18/343,969

(22) Filed: Jun. 29, 2023

(65) Prior Publication Data
US 2025/0004999 A1  Jan. 2, 2025

(51) Int. Cl.
*G06F 16/21* (2019.01)
*G06F 16/2452* (2019.01)

(52) U.S. Cl.
CPC .......... *G06F 16/211* (2019.01); *G06F 16/219* (2019.01); *G06F 16/2452* (2019.01)

(58) Field of Classification Search
CPC ... G06F 16/211; G06F 16/219; G06F 16/2452
See application file for complete search history.

(56) References Cited

U.S. PATENT DOCUMENTS

| | | | |
|---|---|---|---|
| 7,315,805 B2 | 1/2008 | Slater | |
| 7,788,470 B1 | 8/2010 | Purcell | |
| 9,990,383 B2 | 6/2018 | Brinnand | |
| 10,168,691 B2 | 1/2019 | Zornio et al. | |
| 10,936,479 B2 | 3/2021 | Maag et al. | |
| 11,101,037 B2 | 8/2021 | Allen | |
| 11,221,270 B2 | 1/2022 | Evans | |
| 11,281,453 B1 | 3/2022 | Ramachandran | |
| 11,314,517 B2 | 4/2022 | Keski-Valkama | |
| 11,341,605 B1 | 5/2022 | Singh | |
| 11,853,853 B1 | 12/2023 | Beauchesne et al. | |
| 12,008,046 B1 | 6/2024 | Curtis et al. | |

(Continued)

OTHER PUBLICATIONS

Wang, Haozhe, et al., "A graph neural network-based digital twin for network slicing management," IEEE Transactions on Industrial Informatics 18.2 (2020): 1367-1376 (10 Pages).

(Continued)

*Primary Examiner* — Cam Y T Truong
(74) *Attorney, Agent, or Firm* — WOMBLE BOND DICKINSON (US) LLP

(57) ABSTRACT

Methods and systems for managing operation of a data pipeline are disclosed. To manage the operation, a system may include one or more data sources, a data manager, and one or more downstream consumers. Changes to a system of representation of information in data requested by the downstream consumers may cause the data pipeline to provide unusable data to the downstream consumers. To remediate the change, a translation schema may be obtained to translate data based on an unexpected system of representation of information to data based on an expected system of representation of information. The translation schema may be tested and, if the translation schema is determined successful, a translation layer may be added to the data pipeline based on the translation schema.

20 Claims, 7 Drawing Sheets

(56) References Cited

U.S. PATENT DOCUMENTS

| | | | |
|---|---|---|---|
| 12,019,902 | B2 | 6/2024 | Haile |
| 12,182,098 | B1 | 12/2024 | Ezrielev |
| 12,216,651 | B2 | 2/2025 | Krishnan |
| 12,242,447 | B2 | 3/2025 | Ezrielev |
| 12,242,543 | B1 | 3/2025 | Pai |
| 12,242,892 | B1 | 3/2025 | Burnett |
| 2004/0064750 | A1 | 4/2004 | Conway |
| 2006/0009881 | A1 | 1/2006 | Ferber et al. |
| 2013/0205285 | A1 | 8/2013 | Pizlo |
| 2013/0227573 | A1 | 8/2013 | Morsi |
| 2014/0037161 | A1 | 2/2014 | Rucker |
| 2014/0136184 | A1 | 5/2014 | Hatsek |
| 2016/0098037 | A1 | 4/2016 | Zornio |
| 2016/0179063 | A1 | 6/2016 | De Baynast De Septfontaines |
| 2017/0255460 | A1 | 9/2017 | Frank |
| 2017/0262298 | A1 | 9/2017 | Frank |
| 2018/0052708 | A1 | 2/2018 | Ganesan |
| 2018/0081871 | A1 | 3/2018 | Williams |
| 2019/0034430 | A1 | 1/2019 | Das |
| 2019/0236204 | A1 | 8/2019 | Canim |
| 2019/0251479 | A1 | 8/2019 | Anderson et al. |
| 2019/0361697 | A1 | 11/2019 | Hu |
| 2019/0370263 | A1* | 12/2019 | Nucci ............... G06F 16/254 |
| 2020/0166558 | A1 | 5/2020 | Weis |
| 2020/0167224 | A1 | 5/2020 | Abali |
| 2020/0202478 | A1 | 6/2020 | Thumpudi et al. |
| 2020/0293684 | A1 | 9/2020 | Harris |
| 2020/0344325 | A1* | 10/2020 | Sarisky ............. H04L 67/1097 |
| 2020/0356428 | A1 | 11/2020 | Rama |
| 2020/0394044 | A1 | 12/2020 | Keski-Valkama |
| 2021/0027771 | A1 | 1/2021 | Hall |
| 2021/0081836 | A1 | 3/2021 | Polleri |
| 2021/0116505 | A1 | 4/2021 | Shu |
| 2021/0117548 | A1* | 4/2021 | Gokhman ................. G06F 8/71 |
| 2021/0117859 | A1 | 4/2021 | Rogers |
| 2021/0248165 | A1 | 8/2021 | Fry |
| 2021/0374143 | A1 | 12/2021 | Neill |
| 2021/0377286 | A1 | 12/2021 | Shukla et al. |
| 2021/0385196 | A1 | 12/2021 | Rahmat |
| 2021/0406110 | A1 | 12/2021 | Vaid et al. |
| 2022/0014584 | A1 | 1/2022 | Huetter |
| 2022/0086175 | A1 | 3/2022 | Bharrat |
| 2022/0092234 | A1 | 3/2022 | Karri |
| 2022/0301027 | A1 | 9/2022 | Basta |
| 2022/0310276 | A1 | 9/2022 | Wilkinson |
| 2022/0374399 | A1* | 11/2022 | Kementsietsidis ... G06F 16/211 |
| 2023/0014438 | A1 | 1/2023 | Jones |
| 2023/0040834 | A1 | 2/2023 | Haile |
| 2023/0081880 | A1 | 3/2023 | Mathur |
| 2023/0090398 | A1 | 3/2023 | Upadhyay |
| 2023/0126260 | A1 | 4/2023 | Elsakhawy et al. |
| 2023/0153095 | A1 | 5/2023 | Rahill-Marier |
| 2023/0196096 | A1 | 6/2023 | Milne |
| 2023/0213930 | A1 | 7/2023 | Rakshit |
| 2023/0315078 | A1 | 10/2023 | Sepulveda et al. |
| 2023/0342281 | A1 | 10/2023 | Haile |
| 2023/0418280 | A1 | 12/2023 | Emery |
| 2024/0119364 | A1 | 4/2024 | Jain |
| 2024/0126888 | A1 | 4/2024 | Kalou et al. |
| 2024/0235952 | A9 | 7/2024 | Hicks |
| 2024/0281419 | A1 | 8/2024 | Alfaras |
| 2024/0281522 | A1 | 8/2024 | Kuo |
| 2024/0330136 | A1 | 10/2024 | Furlong |
| 2024/0412104 | A1 | 12/2024 | Zhang |

OTHER PUBLICATIONS

Wang, Haozhe, et al., "A graph neural network-based digital twin for network slicing management," IEEE Transactions on Industrial Informatics 18.2 (2020): 1367-1376 (11 Pages).

Almasan, Paul, et al., "Digital Twin Network: Opportunities and challenges," arXiv preprint arXiv:2201.01144 (2022) (7 Pages).

Hu, Weifei, et al., "Digital twin: A state-of-the-art review of its enabling technologies, applications and challenges," Journal of Intelligent Manufacturing and Special Equipment 2.1 (2021): 1-34 (34 Pages).

Khan, Latif U., et al., "Digital-Twin-Enabled 6G: Vision, Architectural Trends, and Future Directions," IEEE Communications Magazine 60.1 (2022): 74-80 (7 Pages).

Nguyen, Huan X., et al., "Digital Twin for 5G and Beyond," IEEE Communications Magazine 59.2 (2021): 10-15. (12 Pages).

Wang, Danshi, et al., "The Role of Digital Twin in Optical Communication: Fault Management, Hardware Configuration, and Transmission Simulation," IEEE Communications Magazine 59.1 (2021): 133-139 (6 Pages).

Pang, Toh Yen, et al., "Developing a digital twin and digital thread framework for an 'Industry 4.0' Shipyard," Applied Sciences 11.3 (2021): 1097 (22 Pages).

Isto, Pekka, et al., "5G based machine remote operation development utilizing digital twin," Open Engineering 10.1 (2020): 265-272 (8 Pages).

Redick, William, "What is Outcome-Based Selling?" Global Performance, Web Page <https://globalperformancegroup.com/what-is-outcome-based-selling/> accessed on Feb. 14, 2023 (8 Pages).

"The Best Data Curation Tools for Computer Vision in 2022," Web Page <https://www.lightly.ai/post/data-curation-tools-2022> accessed on Feb. 14, 2023 (9 Pages).

Bebee, Troy et al., "How to detect machine-learned anomalies in real-time foreign exchange data," Google Cloud, Jun. 10, 2021, Web Page <https://cloud.google.com/blog/topics/financial-services/detect-anomalies-in-real-time-forex-data-with-ml> accessed on Feb. 14, 2023 (16 Pages).

Bosch et al., "Towards Automated Detection of Data Pipeline Faults", 2020 27th Asia-Pacific Software Engineering Conference (APSEC). IEEE, pp. 346-355 (Year: 2020).

Grafberger et al., "Towards Interactively Improving ML Data Preparation Code via Shadow Pipelines", DEEM '24: Proceedings of the Eighth Workshop on Data Management for End-to-End Machine Learning, published on Jun. 9, 2024, retrieved from <https://doi.org/10.1145/3650203.3663327> on Aug. 11, 2025 (5 pages).

* cited by examiner

| | Historic Temperature Data 410 |
|---|---|
| T₁ | 21.2 °C |
| T₂ | 22.1 °C |
| T₃ | 20.0 °C |
| T₄ | 21.8 °C |

| | Updated Historic Temperature Data 412 |
|---|---|
| T₁ | 294.35 K |
| T₂ | 295.25 K |
| T₃ | 293.15 K |
| T₄ | 294.95 K |

FIG. 4B

REMEDIATING A CHANGE IN A SYSTEM OF REPRESENTATION OF INFORMATION IN DATA USED BY A DATA PIPELINE

FIELD

Embodiments disclosed herein relate generally to data management. More particularly, embodiments disclosed herein relate to systems and methods to manage data using data pipelines.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIGS. 4A-4C show block diagrams illustrating a system in accordance with an embodiment over time.

DETAILED DESCRIPTION

Figure 1:
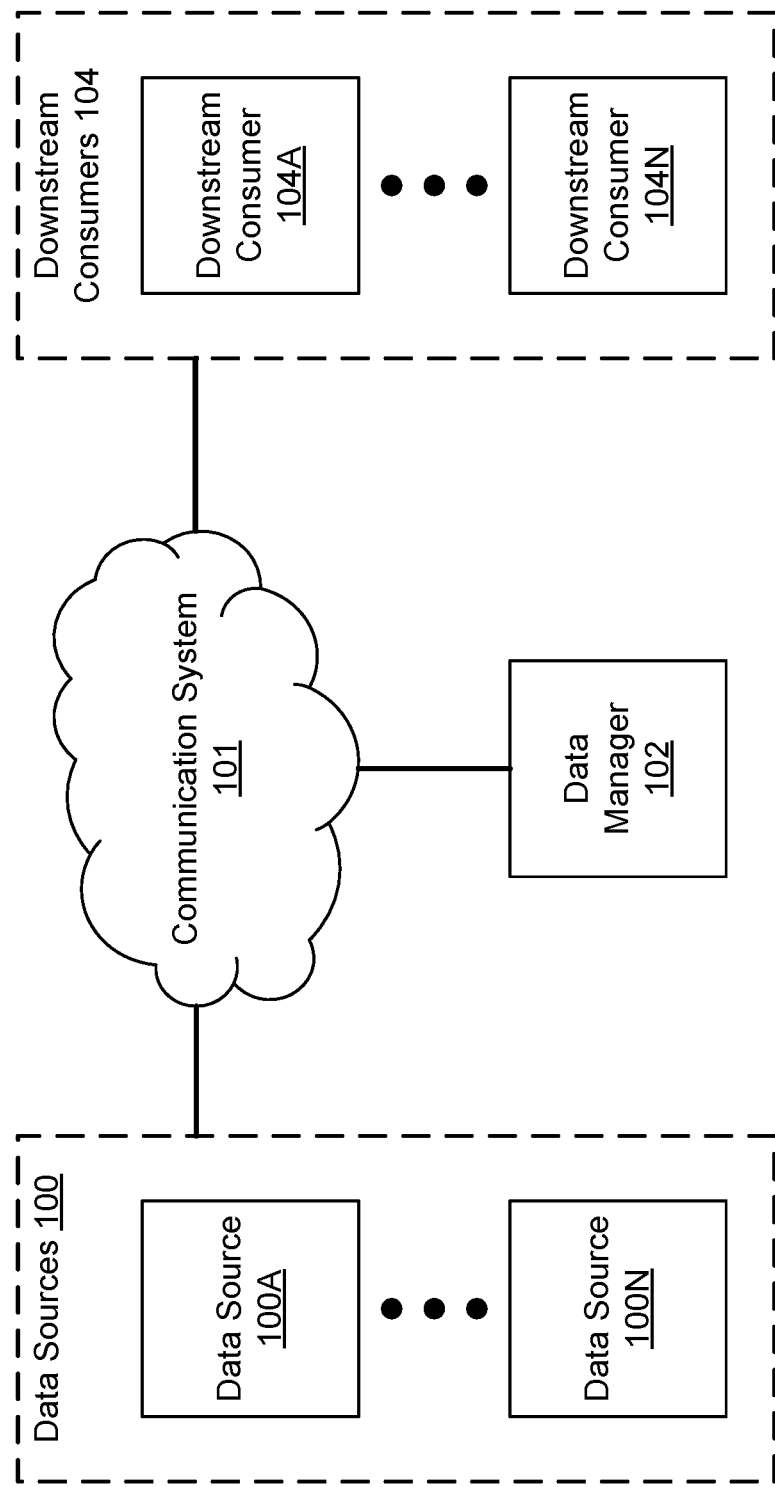
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

In general, embodiments disclosed herein relate to methods and systems for managing data pipelines. Data usable by a data pipeline may be obtained from any number of data sources. Application programming interfaces (APIs) used by the data pipeline may be configured to consume data with certain characteristics (e.g., data that follows an expected system of representation of information, etc.). For example, a data pipeline may provide temperature measurements obtained from data sources (e.g., entities managing any number of temperature sensors) to downstream consumers of the temperature measurements. The APIs may expect to consume temperature measurements in a previously agreed upon format with a given resolution (e.g., with a resolution of the nearest degree Celsius). However, over time, changes to the system of representation of information may occur (e.g., the temperature sensors may be replaced with other temperature sensors, the other temperature sensors having a resolution of the nearest Kelvin, etc.).

Data obtained and fed into the data pipeline that does not meet the expected characteristics may result in unusable (e.g., scrambled, incoherent, etc.) data being provided to the downstream consumers. Doing so may cause delays and/or interruptions to the computer-implemented services intended to be provided using the temperature measurements.

To remediate a change in the system of representation of information, the system may perform an anomaly detection process on incoming data to discern whether anomalies (e.g., those caused by the change in the system of representation of information) are present in the incoming data. The anomaly detection process may have characteristics that determine, for example, a sensitivity of the anomaly detection process. The sensitivity of the anomaly detection process (e.g., a magnitude of a threshold for anomalousness) may determine whether anomalies are detected in the incoming data. To selectively detect certain types of anomalies, the sensitivity may be tuned based on needs of the downstream consumers and/or according to other criteria.

For example, a downstream consumer may wish to be alerted of anomalies caused by changes in systems of representation of information in the data. Different types of anomalies may be associated with different degrees of anomalousness (e.g., extents of deviation from what is expected based on the anomaly detection process). An anomaly caused by a change in a system of representation of information (e.g., a change in resolution of data) may be assigned, for example, a degree of anomalousness with a larger deviation from what is expected than other types of anomalies in the data (e.g., caused by a data value deviating from a historic mean value by a certain amount).

To conform to the anomaly detection preferences of the downstream consumer, the sensitivity of the anomaly detection process may be tuned by modifying the threshold for anomalousness. By doing so, anomalies caused by changes in the system of representation of information may be selectively detected (e.g., by increasing the threshold so larger deviations are more likely to be flagged as anomalous and smaller deviations are less likely to be flagged as anomalous).

If an anomaly is detected in the incoming data, the system may obtain a translation schema intended to remediate the change in the system of representation of information associated with the anomaly. A testing process may be performed to determine whether the translation schema successfully translates between systems of representation of information. If the translation schema is successful, the system may obtain a translation layer (e.g., capable of implementing the translation schema) into the data pipeline and may perform an action set to implement the translation layer in the data pipeline.

By doing so, the system may efficiently respond to changes in systems of representation of information in data intended for use by the data pipeline. Consequently, future incidents of incomplete, incoherent, and/or otherwise unusable data being provided to the downstream consumers may be reduced (and/or swiftly remediated). Therefore, and downstream consumers associated with the data pipeline may more reliably provide computer-implemented services based on data managed by the data pipeline.

In an embodiment, a method of managing a data pipeline is provided. The method may include: obtaining data from one or more data sources associated with the data pipeline, the data being intended to be provided to one or more downstream consumers associated with the data pipeline; making a first determination regarding whether the data comprises anomalous data; in a first instance of the first determination in which the data comprises the anomalous data: obtaining a translation schema intended to remediate a change in a system of representation of information indicated by the anomalous data; making a second determination regarding whether the translation schema successfully remediates the change in the system of representation of information indicated by the anomalous data; and in an instance of the second determination in which the translation schema successfully remediates the change in the system of representation of information indicated by the anomalous data: performing an action set to implement the translation schema in the data pipeline.

Making the first determination may include: performing an anomaly detection process using the data, the anomaly detection process having a tunable sensitivity based on a preference indicated by the one or more downstream consumers.

The sensitivity may indicate a range of data that is considered non-anomalous by the one or more downstream consumers.

The data may be based on a first system of representation of information when the data is within the range of the data that is considered non-anomalous by the one or more downstream consumers and the data may be based on a second system of representation of information when the data is outside the range of the data that that is considered non-anomalous by the one or more downstream consumers.

The change in the system of representation of information may be based on a first identification that the first system of representation of information is used and a second identification that the second system of representation of information has replaced the first system of representation of information in the data.

The data may include the anomalous data when at least a portion of the data is outside the range of the data that considered non-anomalous by the one or more downstream consumers.

Obtaining the translation schema may include: obtaining first historic data, the first historic data being previously provided to the one or more downstream consumers and the first historic data being based on the first system of representation of information; issuing a first request for the first historic data from the one or more data sources to obtain an updated instance of the first historic data, the updated instance of the first historic data being based on the second system of representation of information; mapping portions of the updated instance of the first historic data to corresponding portions of the first historic data to identify a relationship between the first system of representation of information and the second system of representation of information; and obtaining the translation schema based on the relationship.

Data based on the second system of representation of information may have a first resolution of the data and data based on the first system of representation of information may have a second resolution of the data.

Making the second determination may include: obtaining second historic data, the second historic data being different from the first historic data and the second historic data being based on the first system of representation of information; issuing a second request for the second historic data from the one or more data sources to obtain an updated instance of the second historic data, the updated instance of the second historic data being based on the second system of representation of information; and performing a testing process using the translation schema, the second historic data, and the updated instance of the second historic data to determine whether the translation schema faithfully remediates the change in the system of representation of information.

Performing the testing process may include: utilizing the relationship indicated by the translation schema and the updated instance of the second historic data to obtain translated second historic data, wherein the translation schema faithfully remediates the change in the system of representation of information when the translated second historic data matches the second historic data within a threshold.

Performing the action set may include: obtaining a translation layer for the data pipeline, the translation layer being adapted to initiate implementation of the translation schema when future instances of data based on the second system of representation of information are identified.

In an embodiment, a non-transitory media is provided that may include instructions that when executed by a processor cause the computer-implemented method to be performed.

In an embodiment, a data processing system is provided that may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services utilizing data obtained from any number of data sources and managed by a data manager prior to performing the computer-implemented services. The computer-implemented services may include any type and quantity of computer-implemented services. For example, the computer-implemented services may include monitoring services (e.g., of locations), communication services, and/or any other type of computer-implemented services.

To facilitate the computer-implemented services, the system may include data sources 100. Data sources 100 may include any number of data sources. For example, data sources 100 may include one data source (e.g., data source 100A) or multiple data sources (e.g., 100A-100N). Data sources 100 may include any number of internal data sources (e.g., data sources managed and curated by the system of FIG. 1) and/or external data sources (e.g., data sources managed and curated by other entities). Each data source of data sources 100 may include hardware and/or software components configured to obtain data, store data, provide data to other entities, and/or to perform any other task to facilitate performance of the computer-implemented services.

All, or a portion, of data sources 100 may provide (and/or participate in and/or support the) computer-implemented services to various computing devices operably connected to data sources 100. Different data sources may provide similar and/or different computer-implemented services.

For example, data sources 100 may include any number of temperature sensors positioned in an environment to collect temperature measurements according to a data collection schedule. Data sources 100 may be associated with a data pipeline and, therefore, may collect the temperature measurements, may perform processes to sort, organize, format, and/or otherwise prepare the data for future processing in the data pipeline, and/or may provide the data to other data processing systems in the data pipeline (e.g., via one or more application programming interfaces (APIs)).

Data sources 100 may provide data to data manager 102. Data manager 102 may include any number of data processing systems including hardware and/or software components configured to facilitate performance of the computer-implemented services. Data manager 102 may include a database (e.g., a data lake, a data warehouse, etc.) to store data obtained from data sources 100 (and/or other entities throughout a distributed environment).

Data manager 102 may obtain data (e.g., from data sources 100), process the data (e.g., clean the data, transform the data, extract values from the data, etc.), store the data, and/or may provide the data to other entities (e.g., downstream consumer 104) as part of facilitating the computer-implemented services.

Continuing with the above example, data manager 102 may obtain the temperature measurements from data sources 100 as part of the data pipeline. Data manager 102 may obtain the temperature measurements via a request through an API and/or via other methods. Data manager 102 may curate the temperature data (e.g., identify errors/omissions and correct them, etc.) and may store the curated temperature data temporarily and/or permanently in a data lake or other storage architecture. Following curating the temperature data, data manager 102 may provide the temperature measurements to other entities for use in performing the computer-implemented services.

Data managed by data manager 102 (e.g., stored in a data repository managed by data manager 102, obtained directly from internet of things (IoT) devices managed by data manager 102, etc.) may be provided to downstream consumers 104. Downstream consumers 104 may utilize the data from data sources 100 and/or data manager 102 to provide all, or a portion of, the computer-implemented services. For example, downstream consumers 104 may provide computer-implemented services to users of downstream consumers 104 and/or other computing devices operably connected to downstream consumers 104.

Downstream consumers 104 may include any number of downstream consumers (e.g., 104A-104N). For example, downstream consumers 104 may include one downstream consumer (e.g., 104A) or multiple downstream consumers (e.g., 104A-104N) that may individually and/or cooperatively provide the computer-implemented services.

All, or a portion, of downstream consumers 104 may provide (and/or participate in and/or support the) computer-implemented services to various computing devices operably connected to downstream consumers 104. Different downstream consumers may provide similar and/or different computer-implemented services.

Continuing with the above example, downstream consumers 104 may utilize the temperature data from data manager 102 as input data for climate models. Specifically, downstream consumers 104 may utilize the temperature data to simulate future temperature conditions in various environments over time (e.g., to predict weather patterns, climate change, etc.).

Data obtained from data sources 100 may be used by the data pipeline (e.g., may be stored by data manager 102, provided to downstream consumers 104, etc.). Any number of APIs may be integrated into the data pipeline to facilitate communication between components of the data pipeline. Usability of the data (e.g., reliability of data for use in providing computer-implemented services based on the data) provided to downstream consumers 104 may depend on previously determined characteristics of the data (e.g., a system of representation of information, etc.). Data obtained from data sources 100 (and/or requests for the data from downstream consumers 104) that do not include the expected characteristics may result in the data pipeline providing downstream consumers 104 with data that is unusable to perform the computer-implemented services and/or that requires additional resources to use the data.

In general, embodiments disclosed herein may provide methods, systems, and/or devices for remediating a change in a system of representation of information in data that may negatively impact downstream consumers 104. To do so, the system of FIG. 1 may monitor operation of the data pipeline to identify anomalies (e.g., those caused by the change in the system of representation of information) in incoming data from data sources 100 (e.g., via an anomaly detection process, etc.). When anomalies are detected, the system may obtain a translation schema intended to remediate the source of the anomaly (e.g., the change in the system of representation of information). The system may implement a translation layer to the data pipeline based on the translation schema. By doing so, future data obtained from the data sources may be translated prior to being provided to the downstream consumer and, therefore, interruptions to the computer-implemented services based on the data may be reduced.

To provide the above noted functionality, the system of FIG. 1 may: (i) obtain data from one or more data sources associated with the data pipeline, the data being intended to be provided to one or more downstream consumers associated with the data pipeline, and/or (ii) determine whether the data includes anomalous data. If the data includes the anomalous data, the system of FIG. 1 may: (i) obtain a translation schema intended to remediate a change in a system of representation of information indicated by the anomalous data, and/or (ii) may determine whether the translation schema successfully remediates the change in the system of representation of information indicated by the anomalous data. If the translation schema successfully remediates the change in the system of representation of information indicated by the anomalous data, the system of FIG. 1 may: (i) perform an action set to implement the translation schema in the data pipeline.

Figure 2:
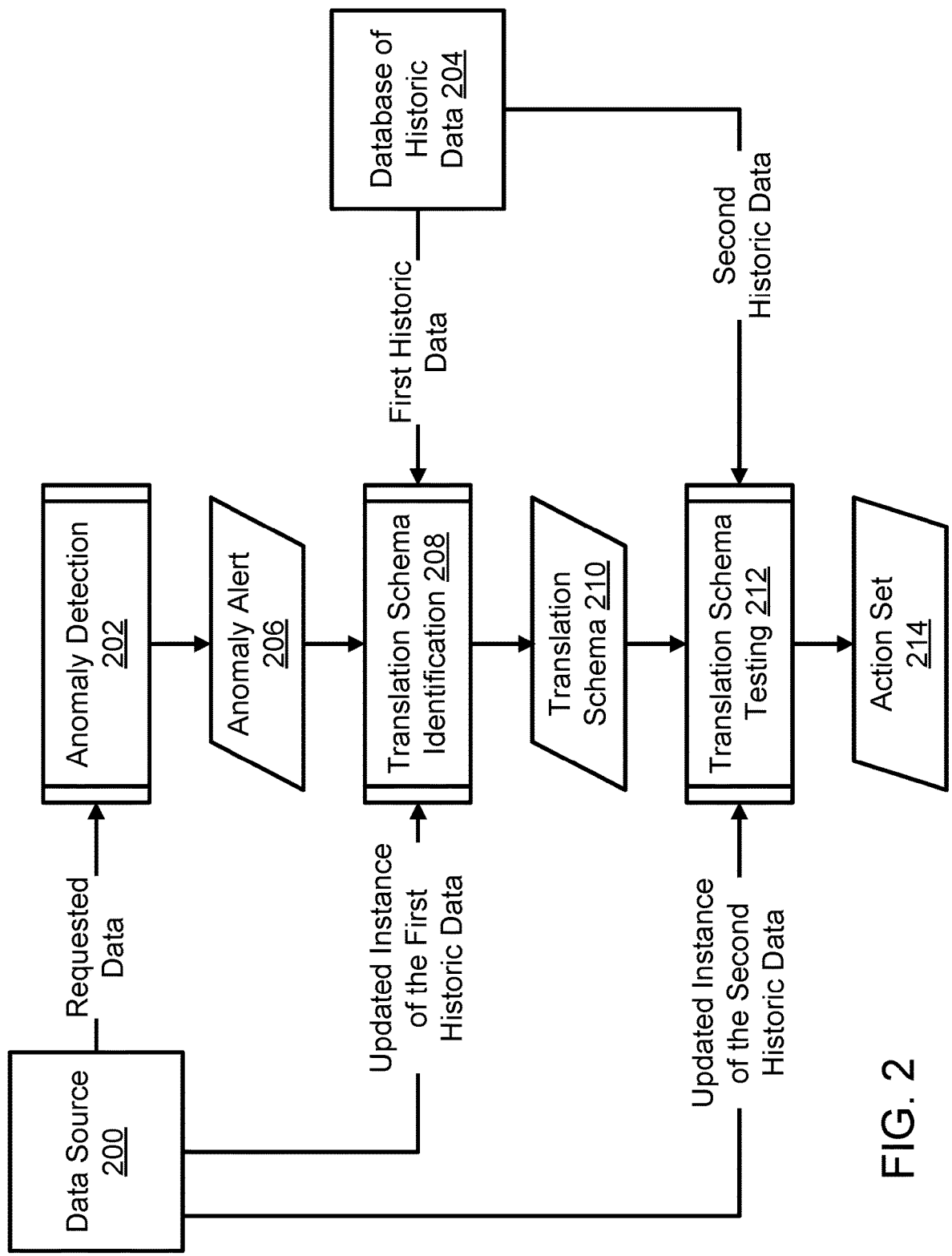
FIG. 2 shows a block diagram illustrating data flow during remediation of a change in a system of representation in data used by the data pipeline in accordance with an embodiment.
Figure 3:
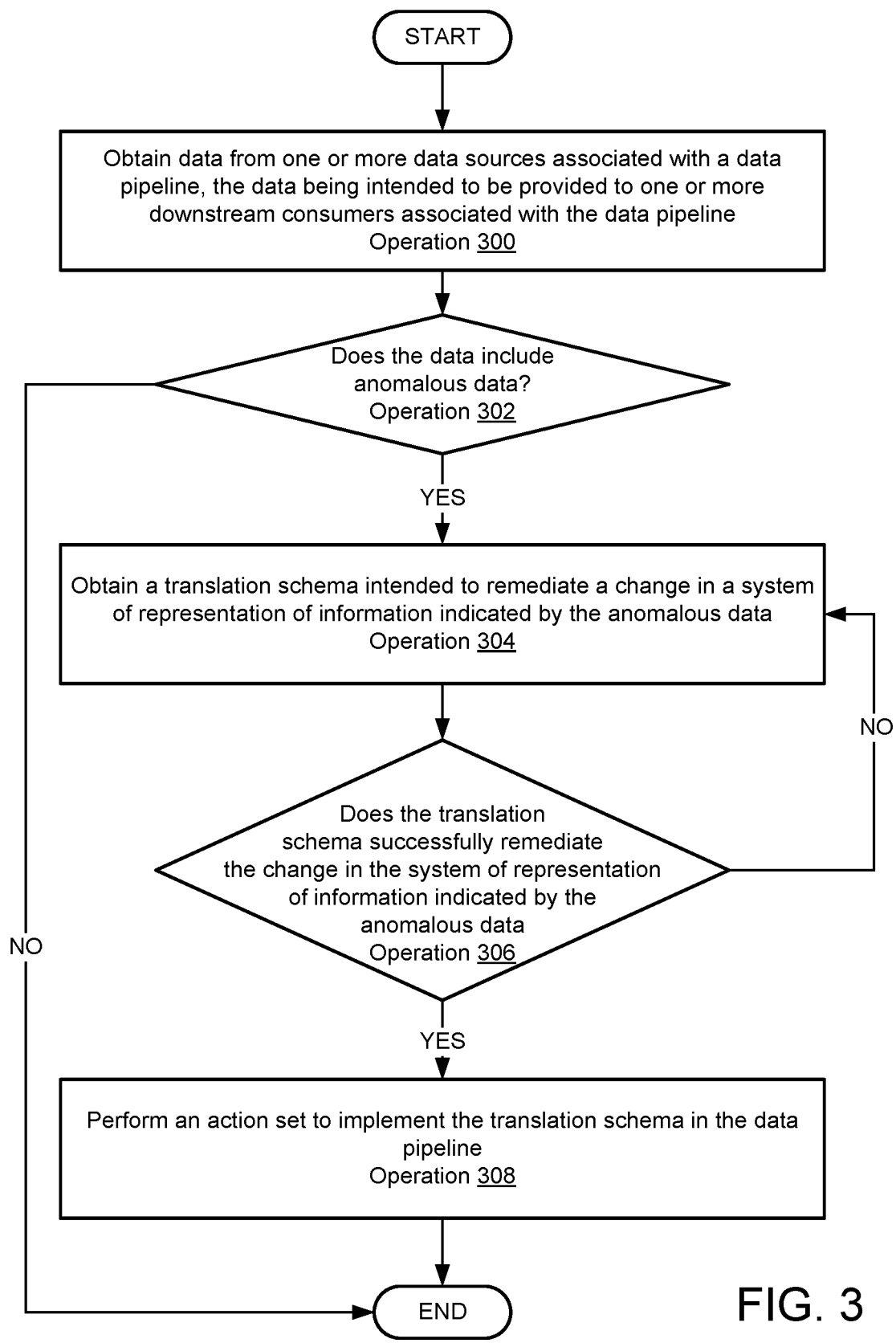
FIG. 3 shows a flow diagram illustrating a method of managing a data pipeline in accordance with an embodiment.

When performing its functionality, data sources 100, data manager 102, and/or downstream consumers 104 may perform all, or a portion, of the methods and/or actions shown in FIGS. 2-3.

Data sources 100, data manager 102, and/or downstream consumers 104 may be implemented using a computing device such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 5.

In an embodiment, one or more of data sources 100, data manager 102, and/or downstream consumers 104 are implemented using an internet of things (IoT) device, which may include a computing device. The IoT device may operate in accordance with a communication model and/or management model known to data sources 100, data manager 102, downstream consumers 104, other data processing systems, and/or other devices.

Any of the components illustrated in FIG. 1 may be operably connected to each other (and/or components not illustrated) with a communication system 101. In an embodiment, communication system 101 may include one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

To further clarify embodiments disclosed herein, diagrams illustrating data flows and/or processes performed in a system in accordance with an embodiment are shown in FIG. 2.

FIG. 2 shows a block diagram illustrating data flow during remediation of a change in a system of representation of information in data used by the data pipeline in accordance with an embodiment. The processes shown in FIG. 2 may be performed by any entity shown in the system of FIG. 1 (e.g., a data source similar to data source 100A, a data manager similar to data manager 102, a downstream consumer similar to downstream consumer 104A, etc.) and/or another entity without departing from embodiments disclosed herein.

Consider a scenario in which a downstream consumer (e.g., similar to any of downstream consumers 104 shown in FIG. 1) provides computer-implemented services using data managed by a data pipeline. To do so, the downstream consumer may request data from other portions of the data pipeline.

In response to the request, requested data may be obtained from data source 200 (e.g., similar to any of data sources 100 shown in FIG. 1). The requested data may include any type and quantity of data encapsulated in a data structure and intended to be provided to the downstream consumer. The requested data may have any number of characteristics (e.g., types of parameters, a number of parameters, an ordering of the parameters) and may be based on a system of representation of information (e.g., each entry of the requested data may have a particular resolution, unit, etc.). The requested data may, for example, include a series of temperature measurements with a resolution of the nearest tenth of a degree Celsius.

The requested data (and/or any other data obtained from the data sources) may undergo anomaly detection 202 process prior to being provided to the downstream consumer via one or more APIs. Anomaly detection 202 process may include, for example, any statistical analysis of the requested data (e.g., cluster analysis, Z-score analysis, etc.) to determine a degree of anomalous of the requested data. Anomaly detection 202 process may also be performed using an inference model (e.g., a neural network) trained to identify anomalies in the requested data based on historic data trends.

Anomaly detection 202 process may have a tunable sensitivity based on a preference indicated by the downstream consumer. The sensitivity may indicate a range of data that is considered non-anomalous by the downstream consumer. The range of data may be defined by any metric (e.g., a static and/or dynamic threshold for anomalousness, etc.) and may be modified over time as needed to account for changes in data provided by data source 200 and/or changes to the needs of the downstream consumer.

The data range may be selected, for example, based on a degree of anomalousness likely to indicate a change in a system of representation of information in data obtained from data source 200. Therefore, the requested data may be based on a first system of representation of information when the requested data is within the range of the data that is considered non-anomalous by the one or more downstream consumers and the requested data may be based on a second system of representation of information when the requested data is outside the range of the data that is considered non-anomalous by the one or more downstream consumers.

The change in the system of representation of information may be based on a first identification that the first system of representation of information is used and a second identification that the second system of representation of information (e.g., any system of representation of information that is different from the first system of representation of information) has replaced the first system of representation of information in the requested data (and/or other data). Therefore, the requested data may include anomalous data when at least a portion of the requested data is outside the range of the data that is considered non-anomalous by the one or more downstream consumers.

The system of representation of information may include, for example, a unit change (e.g., temperature measurements to a tenth of a degree Celsius compared to temperature measurements in Kelvin), a resolution change (e.g., grams to milligrams), and/or other characteristics. Data based on the second system of representation of information may have a first resolution of the data and data based on the first system of representation of information may have a second resolution of the data.

For example, first temperature measurements based on the first system of representation of information of representation may deviate from past and/or predicted future data by a certain amount and may be assigned a first degree of anomalousness. However, second temperature measurements based on the second system of representation of information (e.g., with a different resolution) may be assigned a second degree of anomalousness, the second degree of anomalousness indicating a larger deviation from what is expected than the first degree of anomalousness.

The range of data (and, therefore, the threshold for anomalousness) may be modified so that the second temperature measurements (e.g., with the second degree of anomalousness) are flagged as anomalous and the first temperature measurements (e.g., with the first degree of anomalousness) are not flagged as anomalous. The sensitivity may be modified (e.g., tuned) so that anomaly detection 202 process selectively identifies anomalies that are likely to be caused by changes in the system of representation of information.

Anomaly detection 202 process may generate anomaly alert 206 when an anomaly is detected in the requested data. Anomaly alert 206 may include a notification of the detected anomaly, information related to the detected anomaly, and/or other information encapsulated in a data structure. The information related to the detected anomaly may include: (i) the anomalous portion of the requested data, (ii) one or more identifiers associated with the anomalous portion of the requested data (e.g., timestamps, identification numbers, access credentials for accessing the anomalous data, etc.), (iii) information regarding a type of anomaly suspected to exist in the requested data (e.g., the change in the system of representation of information), and/or (iv) other information.

Anomaly alert 206 may trigger performance of translation schema identification 208 process. Translation schema identification 208 process may utilize anomaly alert 206, historic data from database of historic data 204, and/or other data to obtain translation schema 210. To do so, translation schema identification 208 process may include obtaining first historic data from database of historic data 204. The first historic data may have been previously provided to the downstream consumer and the first historic data may have been based on the first system of representation of information. Therefore, the first historic data may not have been treated as including anomalous data.

Following obtaining the first historic data, a first request may be issued to data source 200 (e.g., the data source from which the first historic data was previously obtained) for the first historic data (not shown). An updated instance of the first historic data may be obtained in response to the first request. The updated instance of the first historic data may be based on the second system of representation of information. The requested data may also utilize the second system of representation of information and, therefore, the updated instance of the first historic data may include anomalies similar to those identified in the requested data.

Translation schema identification 208 process may also include mapping portions of the updated instance of the first historic data to corresponding portions of the first historic data to identify a relationship between the first system of representation of information and the second system of representation of information. Translation schema 210 may be obtained based on the relationship. Translation schema 210 may include instructions for performing a process (e.g., an algorithm) for ingesting data based on the second system of representation of information and translating the data to an instance of the data that is based on the first system of representation of information.

To determine whether translation schema 210 successfully translates the second system of representation of information to the first system of representation of information, translation schema testing 212 process may be performed. Translation schema testing 212 process may utilize translation schema 210, historic data from database of historic data 204, and/or other data to test translation schema 210.

Translation schema testing 212 process may include obtaining second historic data from database of historic data 204, issuing a second request for the second historic data from data source 200 (e.g., the data source from which the second historic data was previously obtained) (not shown), and obtaining an updated instance of the second historic data in response to the request. The second historic data may be different from the first historic data and the second historic data may be based on the first system of representation of information. In addition, the updated instance of the second historic data may be based on the second system of representation of information.

Translation schema 210 may be utilized to translate the updated instance of the second historic data from the second system of representation of information to the first system of representation of information. The second historic data obtained from database of historic data 204 may be compared to the translated instance of the second historic data to determine whether the translation schema 210 is successful. Translation schema 210 may successfully remediate the change in the system of representation of information if the translated second historic data matches the second historic data within a threshold (not shown).

In FIG. 2, translation schema 210 may be considered successful and action set 214 may be obtained in response to the successful result. Action set 214 may include instructions for remediating the change in the system of representation of information identified in the requested data using translation schema 210. Action set 214 may include, for example, instructions for generating and implementing a translation layer (not shown) in the data pipeline. The translation layer may be adapted to initiate implementation of translation schema 210 when future instances of data based on the second system of representation of information are identified.

Action set 214 may also include an indication that the translation layer is keyed to data source 200, and, therefore, the translation layer may be activated only when future data is obtained from data source 200.

In addition, action set 214 may include generating and providing a notification of the actions performed (e.g., implementing the translation layer) to any entity (e.g., the downstream consumer, administrators responsible for managing the data pipeline, etc.).

By doing so, future instances of changes in the system of representation of information identified in data from data source 200 (and/or other data sources) may be reduced and the reliability of computer-implemented services based on data from data source 200 (and/or other data sources) may be increased.

In an embodiment, the one or more entities performing the operations shown in FIG. 2 are implemented using a processor adapted to execute computing code stored on a persistent storage that when executed by the processor performs the functionality of the system of FIG. 1 discussed throughout this application. The processor may be a hardware processor including circuitry such as, for example, a central processing unit, a processing core, or a microcontroller. The processor may be other types of hardware devices for processing information without departing from embodiments disclosed herein.

As discussed above, the components of FIG. 1 may perform various methods to manage operation of a data pipeline. FIG. 3 illustrates methods that may be performed by the components of FIG. 1. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method of managing a data pipeline in accordance with an embodiment is shown. The method may be performed, for example, by a data source, data manager, downstream consumer, and/or any other entity.

At operation 300, data from one or more data sources associated with a data pipeline are obtained, the data being intended to be provided to one or more downstream consumers associated with the data pipeline. Obtaining the data may include: (i) reading the data from storage (e.g., from a data repository, data lake, and/or any other storage structure), (ii) collecting the data (e.g., via a sensor positioned in an ambient environment), (iii) obtaining the data from another entity responsible for collecting and/or storing the data, (iv) accessing a database using access credentials to obtain the data, and/or (v) other methods.

At operation 302, it is determined whether the data includes anomalous data. Determining whether the data includes anomalous data may include: (i) performing an anomaly detection process using the data, (ii) receiving a notification from another entity that the data includes anomalous data, (iii) locating the data in a database labeled as including anomalous data, and/or (iv) other methods.

Performing the anomaly detection process using the data may include: (i) obtaining a degree of anomalousness for the data, (ii) comparing the degree of anomalousness to an anomalousness threshold, and/or (iii) other methods.

Obtaining the degree of anomalousness for the data may include: (i) performing a cluster analysis using the data, (ii) performing an isolation forest process using unsupervised machine learning. (iii) performing a statistical analysis to compare each element of the data to historic data trends (e.g., via determining a number of standard deviations away from the historic data mean each element of the data is), and/or (iv) other methods.

If the data includes the anomalous data, the method may proceed to operation 304. If the data does not include the anomalous data, the method may end following operation 302.

At operation 304, a translation schema intended to remediate a change in a system of representation of information indicated by the anomalous data is obtained. Obtaining the translation schema may include: (i) obtaining first historic data, (ii) issuing a first request for the first historic data from the one or more data sources to obtain an updated instance of the first historic data, (iii) mapping portions of the updated instance of the first historic data to corresponding portions of the first historic data to identify a relationship between the first system of representation of information and the second system of representation of information, and/or (iv) obtaining the translation schema based on the relationship.

Obtaining the first historic data may include: (i) reading the first historic data from storage (e.g., by accessing a database of historic data, data repository, etc.), (ii) requesting the first historic data from another entity responsible for managing a database of historic data and receiving the first historic data in response to the request, and/or (iii) other methods.

Issuing the first request for the first historic data from the one or more data sources may include: (i) using the first historic data to obtain an identifier associated with the first historic data (e.g., a timestamp, a characteristic, etc.), the identifier being usable to request the first historic data from the one or more data sources, (ii) transmitting a message to the one or more data sources, the message including a request for data associated with the identifier, (iii) obtaining a response to the first request in the form of a message, the response from the first request including the updated instance of the first historic data.

Mapping the portions of the updated instance of the first historic data to corresponding portions of the first historic data may include: (i) obtaining a first set of elements from the first historic data, each element of the first set of the elements being associated with an identifier (e.g., a timestamp, etc. identifying a particular portion of the first historic data), (ii) obtaining a second set of elements from the updated instance of the first historic data, each element of the second set of the elements being associated with a corresponding element of the first historic data (e.g., via a matching associated identifier), and/or (iii) generating a series of connections, each connection of the series of the connections including an element from the first historic data and a corresponding element from the updated historic data.

Mapping the portions of the updated instance of the first historic data to corresponding portions of the first historic data may also include: (i) transmitting the updated instance of the first historic data and the first historic data to another entity responsible for generating the series of connections, and/or (ii) receiving the mapped portions (e.g., the series of connections) from the entity.

Obtaining the translation schema based on the relationship may include: (i) generating the translation schema, (ii) providing the series of connections to another entity responsible for generating the translation schema and receiving the translation schema from the entity in response to the series of connections, (iii) reading the translation schema from storage, and/or (iv) other methods.

At operation 306, it is determined whether the translation schema successfully remediates the change in the system of representation of information indicated by the anomalous data. Determining whether the translation schema successfully remediates the change in the system of representation of information may include: (i) obtaining second historic data, (ii) issuing a second request for the second historic data from the one or more data sources to obtain an updated instance of the second historic data, and/or (iii) performing a testing process using the translation schema, the second historic data, and the updated instance of the second historic data to determine whether the translation schema successfully remediates the change in the system of representation of information.

Obtaining the second historic data may include: (i) reading the second historic data from storage (e.g., by accessing a database of historic data, data repository, etc.), (ii) requesting the second historic data from another entity responsible for managing a database of historic data and receiving the second historic data in response to the request, and/or (iii) other methods.

Issuing the second request for the second historic data from the one or more data sources may include: (i) using the second historic data to obtain an identifier associated with the second historic data (e.g., a timestamp, a characteristic, etc.), the identifier being usable to request the second historic data from the one or more data sources, (ii) transmitting a message to the one or more data sources, the message including a request for data associated with the identifier, (iv) obtaining a response to the second request in the form of a message, the response from the second request including the updated instance of the second historic data.

Performing the testing process may include: (i) utilizing the relationship indicated by the translation schema and the updated instance of the second historic data to obtain translated second historic data, (ii) comparing the translated second historic data to the second historic data to obtain a difference, (iii) comparing the difference to a translation threshold, and/or (iv) if the difference falls within the threshold, treating the translation schema as successful.

Utilizing the relationship indicated by the translation schema and the updated instance of the second historic data to obtain translated second historic data may include performing a translation process using the updated instance of the second historic data and the translation schema, the translation process being performed by a rules-based engine, inference model, and/or other method of performing operations dictated by the translation schema.

Utilizing the relationship indicated by the translation schema and the updated instance of the second historic data to obtain translated second historic data may also include: transmitting the translation schema and the updated second historic data to another entity responsible for performing the operations dictated by the translation schema.

If the translation layer successfully remediates the change in the system of representation of information indicated by the anomalous data, the method may proceed to operation 308. If the translation layer does not successfully remediate the change in the system of representation of information indicated by the anomalous data, the method may return to operation 304.

At operation 308, an action set to implement the translation schema in the data pipeline is performed. Performing the action set may include: (i) obtaining a translation layer for the data pipeline, the translation layer being adapted to initiate implementation of the translation schema when future instances of data based on the second system of representation of information are identified, (ii) updating the data pipeline using the translation layer, and/or (iii) providing instructions to the data pipeline, the instructions indicating conditions under which the translation layer is to be utilized (e.g., when data is obtained from certain data sources, etc.).

Obtaining the translation layer may include: (i) generating the translation layer, (ii) reading the translation layer from storage, (iii) receiving the translation layer from another entity responsible for generating translation layers, and/or (iv) other methods.

Performing the action set may also include: (i) generating and/or otherwise obtaining a notification of the actions performed in response to the change in the system of representation of information (e.g., the implementation of the translation layer), (ii) storing the notification in storage and/or providing the notification to another entity (e.g., the downstream consumer, administrators responsible for managing the data pipeline, etc.), and/or (iii) other actions to record the modifications made to the data pipeline.

The method may end following operation 308.

Figure 4A:
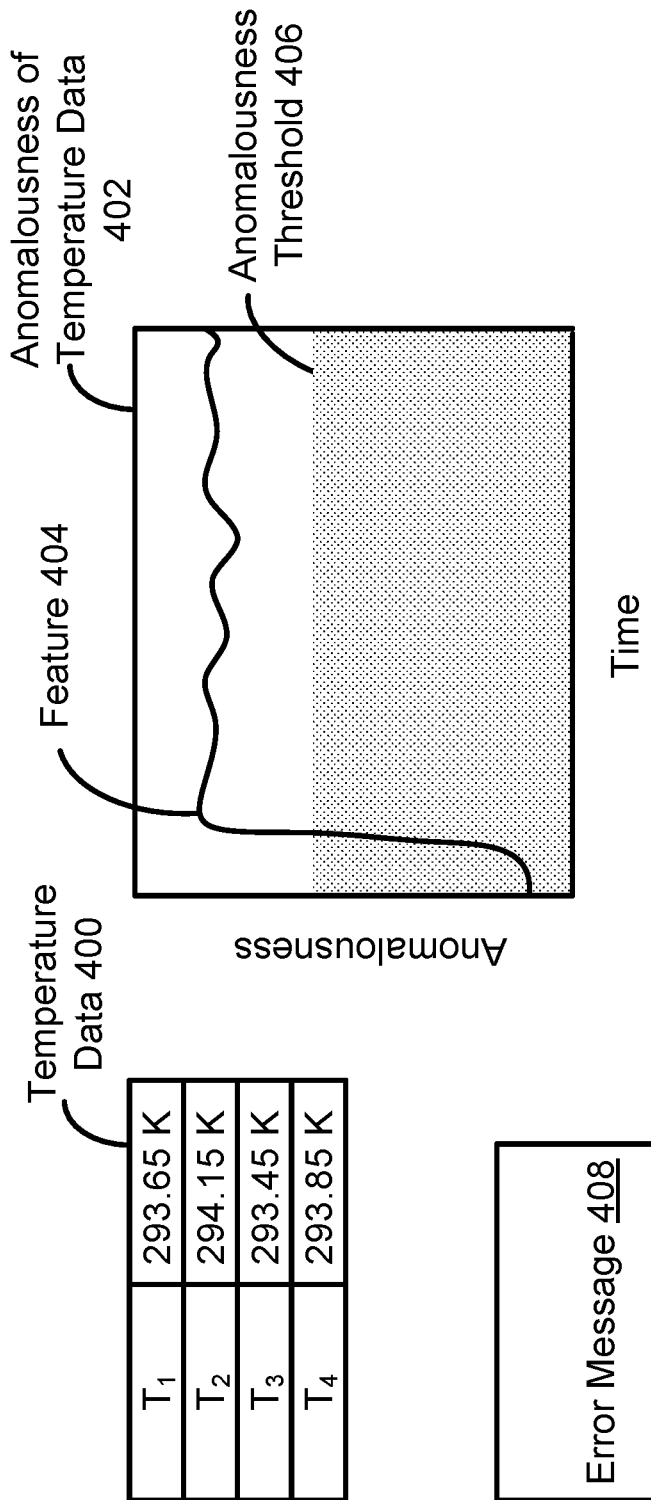

Turning to FIG. 4A, consider a scenario in which one or more downstream consumers associated with a data pipeline issued a request to an API for data usable to provide computer-implemented services. The requested data may include temperature data 400. Prior to providing temperature data 400 to the one or more downstream consumers, an anomaly detection process may be performed using at least temperature data 400 to obtain anomalousness of temperature data 402.

Anomalousness of temperature data 402 may include a graphical representation of degrees of anomalousness of portions of data over time. The portion of data that includes temperature data 400 may be associated with the feature 404. Feature 404 may indicate that the degree of anomalousness associated with temperature data 400 exceeds anomalousness threshold 406. Consequently, error message 408 may be generated, error message 408 indicating that an anomaly has been detected in temperature data 400. The anomaly in temperature data 400 may be treated as being caused by a change in a system of representation of information.

Turning to FIG. 4B, the anomaly associated with temperature data 400 may be remediated by generating a translation schema (not shown). To generate the translation schema, historic temperature data 410 may be obtained from a historic data database. Historic temperature data 410 may be based on a first system of representation of information (e.g., temperature measurements in degrees Celsius) and may not have been previously flagged as anomalous. To determine whether the change in the system of representation of information has occurred, a request for the temperature measurements associated with historic temperature data 410 may be transmitted to the data source that initially provided historic temperature data 410. Updated historic temperature data 412 may be obtained in response.

Updated historic temperature data 412 may be based on a second system of representation of information (temperature in Kelvin). To obtain the translation schema, each element of historic temperature data 410 (e.g., the temperature value at $T_1$, etc.) may be connected to a corresponding element of updated historic temperature data (e.g., the temperature value at $T_1$, etc.). These connections may be used to determine how to translate the second system of representation of information to the first system of representation of information (e.g., converting degrees Celsius to Kelvin).

Figure 4C:
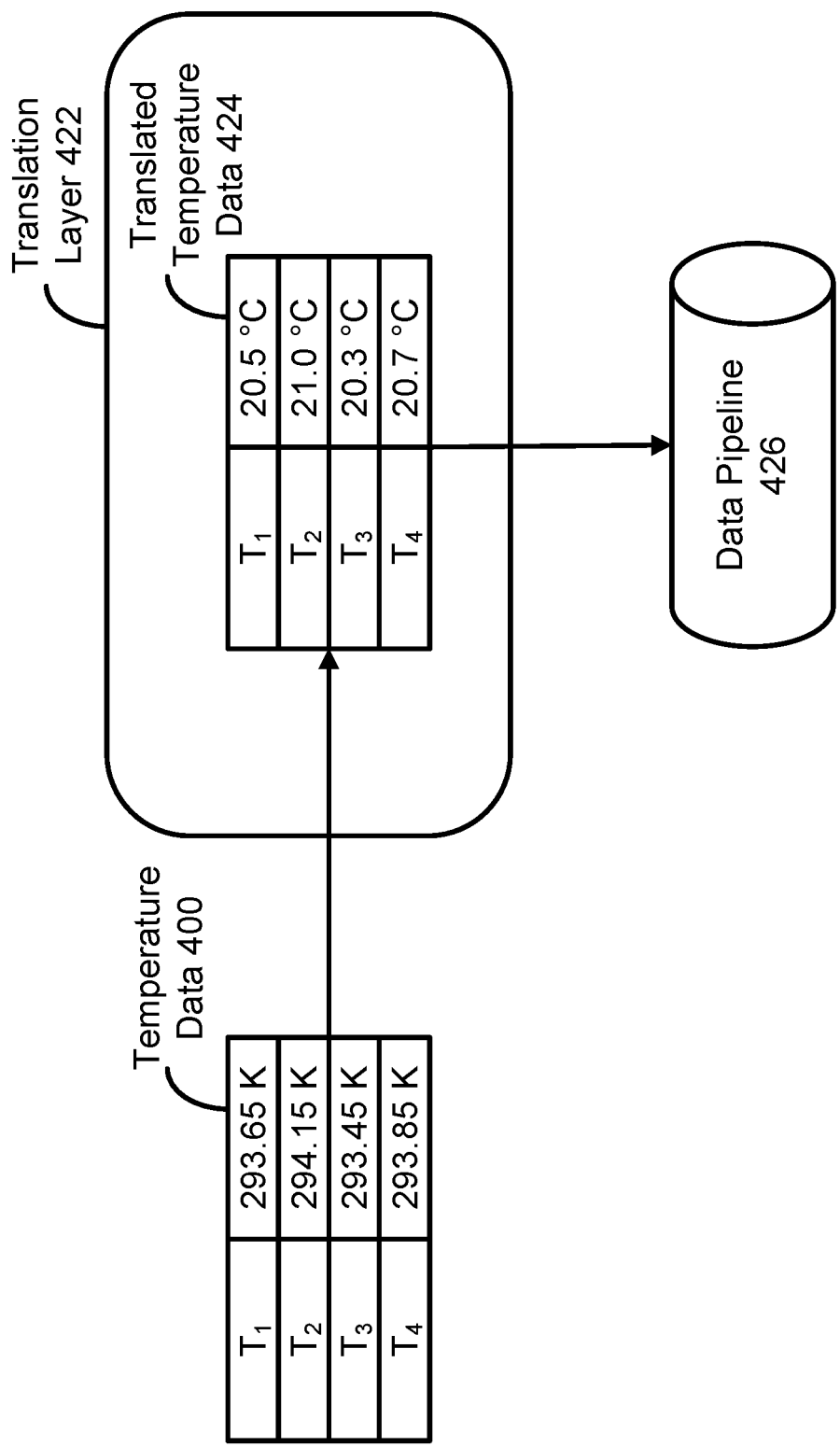

Turning to FIG. 4C, translation layer 422 may be added to data pipeline 426. Translation layer 422 may implement the previously obtained translation schema to translate temperature data 400 to translated temperature data 424. Translated temperature data 424 may be generated by translation layer 422 converting each element of temperature data 400 to degrees Celsius. Translated temperature data 424 may then be inputted into data pipeline 426 and provided to the downstream consumer.

Figure 5:
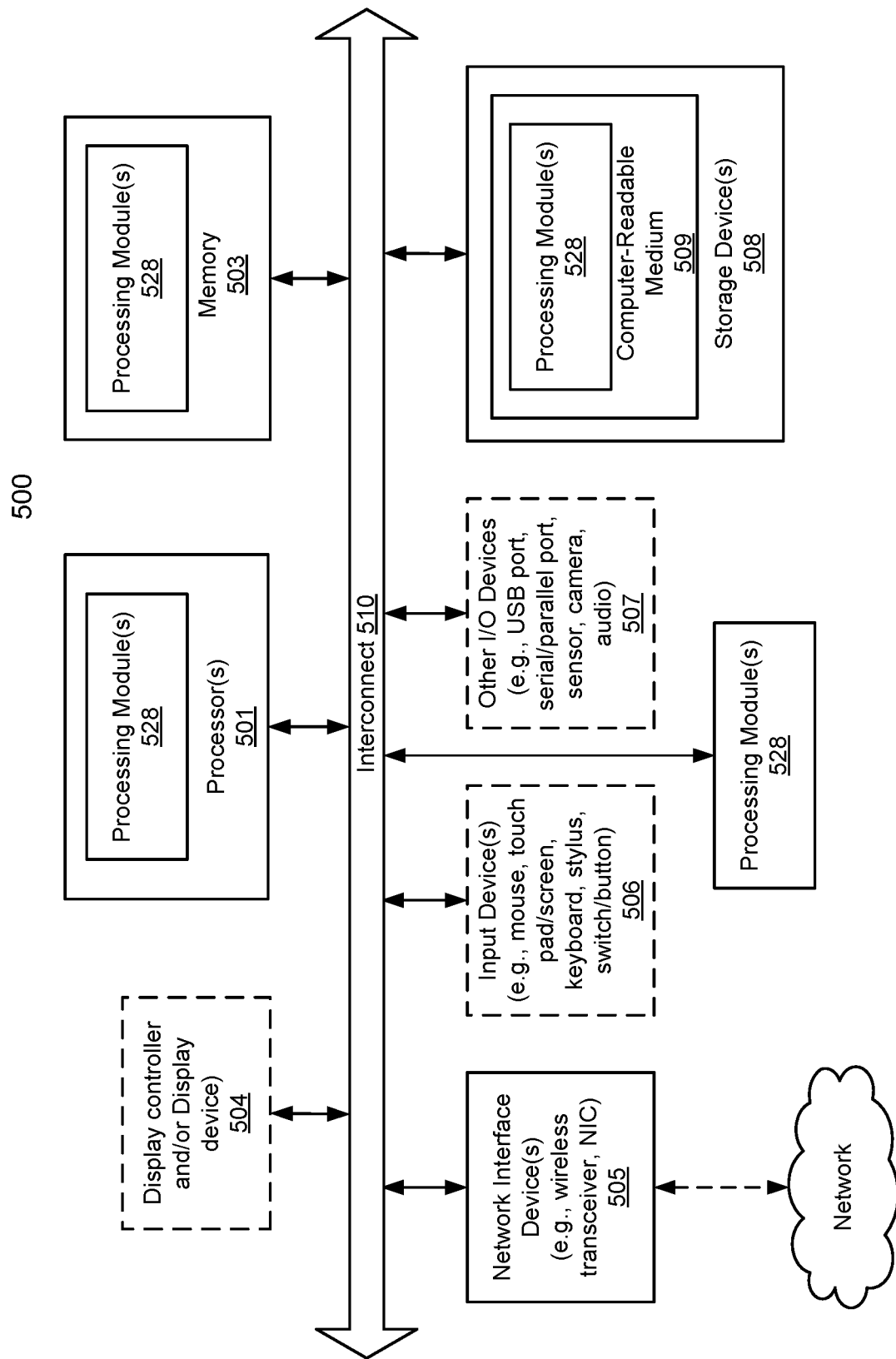
FIG. 5 shows a block diagram illustrating a data processing system in accordance with an embodiment.

Any of the components illustrated in FIGS. 1-4C may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-507 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 500 may further include IO devices such as devices (e.g., 505, 506, 507, 508) including network interface device(s) 505, optional input device(s) 506, and other optional IO device(s) 507. Network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method of managing a data pipeline, the method being performed by a processor of a data processing system and comprising:
    obtaining data from one or more data sources associated with the data pipeline, the data being provided to one or more downstream consumers associated with the data pipeline;
    making a first determination regarding whether the data comprises anomalous data containing a change in a system of representation of information that is associated with non-anomalous data;
    in a first instance of the first determination in which the data comprises the anomalous data:
    obtaining a translation schema intended to remediate the change in the system of representation of information within the anomalous data;
    making a second determination regarding whether the translation schema successfully remediates the change in the system of representation of information indicated by the anomalous data; and
    in an instance of the second determination in which the translation schema successfully remediates the change in the system of representation of information indicated by the anomalous data:
    performing an action set to implement the translation schema in the data pipeline by at least:
    generating an application programming interface (API) translation layer for the data pipeline; and
    inserting the API translation layer into the data pipeline to obtain an updated data pipeline, the updated data pipeline being caused to use the API translation layer to transform the anomalous data into corrected data using the translation schema, the corrected data being provided to the one or more downstream consumers instead of the anomalous data.

2. The method of claim 1, wherein making the first determination comprises:
    performing an anomaly detection process using the data, the anomaly detection process having a tunable sensitivity based on a preference indicated by the one or more downstream consumers.

3. The method of claim 2, wherein the sensitivity indicates a range of data that is considered non-anomalous by the one or more downstream consumers.

4. The method of claim 3, wherein the data is based on a first system of representation of information when the data is within the range of the data that is considered non-anomalous by the one or more downstream consumers and the data is based on a second system of representation of information when the data is outside the range of the data that is considered non-anomalous by the one or more downstream consumers.

5. The method of claim 4, wherein the change in the system of representation of information is based on a first identification that the first system of representation of information is used and a second identification that the second system of representation of information has replaced the first system of representation of information in the data.

6. The method of claim 5, wherein the data comprises the anomalous data when at least a portion of the data is outside the range of the data that considered non-anomalous by the one or more downstream consumers.

7. The method of claim 6, wherein obtaining the translation schema comprises:
obtaining first historic data, the first historic data being previously provided to the one or more downstream consumers and the first historic data being based on the first system of representation of information;
issuing a first request for the first historic data from the one or more data sources to obtain an updated instance of the first historic data, the updated instance of the first historic data being based on the second system of representation of information;
mapping portions of the updated instance of the first historic data to corresponding portions of the first historic data to identify a relationship between the first system of representation of information and the second system of representation of information; and
obtaining the translation schema based on the relationship.

8. The method of claim 7, wherein data based on the second system of representation of information has a first resolution of the data and data based on the first system of representation of information has a second resolution of the data.

9. The method of claim 8, wherein making the second determination comprises:
obtaining second historic data, the second historic data being different from the first historic data and the second historic data being based on the first system of representation of information;
issuing a second request for the second historic data from the one or more data sources to obtain an updated instance of the second historic data, the updated instance of the second historic data being based on the second system of representation of information; and
performing a testing process using the translation schema, the second historic data, and the updated instance of the second historic data to determine whether the translation schema faithfully remediates the change in the system of representation of information.

10. The method of claim 9, wherein performing the testing process comprises:
utilizing the relationship indicated by the translation schema and the updated instance of the second historic data to obtain translated second historic data,
wherein the translation schema faithfully remediates the change in the system of representation of information when the translated second historic data matches the second historic data within a threshold.

11. The method of claim 1, wherein the action set comprises the updated data pipeline being caused to use the API translation layer further to:
insert the corrected data back into the updated data pipeline to provide the corrected data to the one or more downstream consumer instead of the anomalous data.

12. A non-transitory machine-readable medium having instructions stored therein, which when executed by a processor, cause the processor to perform operations for managing a data pipeline, the operations comprising:
obtaining data from one or more data sources associated with the data pipeline, the data being provided to one or more downstream consumers associated with the data pipeline;
making a first determination regarding whether the data comprises anomalous data containing a change in a system of representation of information that is associated with non-anomalous data;
in a first instance of the first determination in which the data comprises the anomalous data:
obtaining a translation schema intended to remediate the change in the system of representation of information within the anomalous data;
making a second determination regarding whether the translation schema successfully remediates the change in the system of representation of information indicated by the anomalous data; and
in an instance of the second determination in which the translation schema successfully remediates the change in the system of representation of information indicated by the anomalous data:
performing an action set to implement the translation schema in the data pipeline by at least:
generating an application programming interface (API) translation layer for the data pipeline; and
inserting the API translation layer into the data pipeline to obtain an updated data pipeline, the updated data pipeline being caused to use the API translation layer to transform the anomalous data into corrected data using the translation schema, the corrected data being provided to the one or more downstream consumers instead of the anomalous data.

13. The non-transitory machine-readable medium of claim 12, wherein making the first determination comprises:
performing an anomaly detection process using the data, the anomaly detection process having a tunable sensitivity based on a preference indicated by the one or more downstream consumers.

14. The non-transitory machine-readable medium of claim 13, wherein the sensitivity indicates a range of data that is considered non-anomalous by the one or more downstream consumers.

15. The non-transitory machine-readable medium of claim 14, wherein the data is based on a first system of representation of information when the data is within the range of the data that is considered non-anomalous by the one or more downstream consumers and the data is based on a second system of representation of information when the data is outside the range of the data that is considered non-anomalous by the one or more downstream consumers.

16. The non-transitory machine-readable medium of claim 15, wherein the change in the system of representation of information is based on a first identification that the first system of representation of information is used and a second identification that the second system of representation of information has replaced the first system of representation of information in the data.

17. A data processing system, comprising:
a processor; and
a memory coupled to the processor to store instructions, which when executed by the processor, cause the processor to perform operations for managing a data pipeline, the operations comprising:
obtaining data from one or more data sources associated with the data pipeline, the data being provided to one or more downstream consumers associated with the data pipeline;
making a first determination regarding whether the data comprises anomalous data containing a change in a system of representation of information that is associated with non-anomalous data;
in a first instance of the first determination in which the data comprises the anomalous data:

obtaining a translation schema intended to remediate the change in the system of representation of information within the anomalous data;

making a second determination regarding whether the translation schema successfully remediates the change in the system of representation of information indicated by the anomalous data; and in an instance of the second determination in which the translation schema successfully remediates the change in the system of representation of information indicated by the anomalous data:

performing an action set to implement the translation schema in the data pipeline by at least:

generating an application programming interface (API) translation layer for the data pipeline; and inserting the API translation layer into the data pipeline to obtain an updated data pipeline, the updated data pipeline being caused to use the API translation layer to transform the anomalous data into corrected data using the translation schema, the corrected data being provided to the one or more downstream consumers instead of the anomalous data.

18. The data processing system of claim 17, wherein making the first determination comprises:

performing an anomaly detection process using the data, the anomaly detection process having a tunable sensitivity based on a preference indicated by the one or more downstream consumers.

19. The data processing system of claim 18, wherein the sensitivity indicates a range of data that is considered non-anomalous by the one or more downstream consumers.

20. The data processing system of claim 19, wherein the data is based on a first system of representation of information when the data is within the range of the data that is considered non-anomalous by the one or more downstream consumers and the data is based on a second system of representation of information when the data is outside the range of the data that is considered non-anomalous by the one or more downstream consumers.

* * * * *